US012571500B2

(12) United States Patent
Song et al.

(10) Patent No.: US 12,571,500 B2
(45) Date of Patent: Mar. 10, 2026

(54) MULTI-MATERIAL HIGH-PRESSURE TANKS FOR VEHICLES

(71) Applicant: WAL Fuel Systems USA Inc., Livonia, MI (US)

(72) Inventors: Xiankai Song, Livonia, MI (US); Sami Siddiqui, Livonia, MI (US); Longhan Chen, Livonia, MI (US)

(73) Assignee: WAL Fuel Systems USA Inc., Livonia, MI (US)

(*) Notice: Subject to any disclaimer, the term of this patent is extended or adjusted under 35 U.S.C. 154(b) by 74 days.

(21) Appl. No.: 18/468,417

(22) Filed: Sep. 15, 2023

(65) Prior Publication Data

US 2025/0092994 A1 Mar. 20, 2025

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01); *F17C 2203/0604* (2013.01); *F17C 2203/0621* (2013.01); *F17C 2203/066* (2013.01); *F17C 2203/0673* (2013.01); *F17C 2205/0305* (2013.01); *F17C 2205/0311* (2013.01); *F17C 2205/0323* (2013.01); *F17C 2209/22* (2013.01); *F17C 2223/035* (2013.01); *F17C 2260/013* (2013.01); *F17C 2270/0171* (2013.01)

(58) Field of Classification Search
CPC ................ F17C 1/06; F17C 2201/0109; F17C 2203/0604; F17C 2203/0621
See application file for complete search history.

(56) References Cited

U.S. PATENT DOCUMENTS

| | | | | | |
|---|---|---|---|---|---|
| 5,202,165 | A * | 4/1993 | Lusignea | F17C 1/16 | 156/173 |
| 2004/0026431 | A1* | 2/2004 | Jones | F17C 1/06 | 220/588 |
| 2010/0276434 | A1* | 11/2010 | Berger | F17C 1/16 | 427/372.2 |
| 2017/0136716 | A1* | 5/2017 | Shindo | B29C 53/562 | |
| 2020/0224823 | A1* | 7/2020 | Hatta | B29C 63/08 | |
| 2020/0230866 | A1* | 7/2020 | Totsuka | B29C 70/32 | |
| 2020/0309321 | A1* | 10/2020 | Ueda | B29C 70/70 | |
| 2021/0123566 | A1* | 4/2021 | Fujii | F17C 1/06 | |
| 2022/0170593 | A1* | 6/2022 | Lee | F17C 1/02 | |
| 2023/0081419 | A1* | 3/2023 | VanOyen | F17C 1/06 | 220/581 |
| 2023/0228377 | A1* | 7/2023 | Iida | F17C 1/16 | 220/588 |
| 2023/0235853 | A1* | 7/2023 | Pu | F17C 1/16 | 220/581 |
| 2023/0358361 | A1* | 11/2023 | Lee | F17C 1/06 | |
| 2025/0020279 | A1* | 1/2025 | Song | F17C 1/08 | |

* cited by examiner

*Primary Examiner* — Don M Anderson
(74) *Attorney, Agent, or Firm* — Young Basile Hanlon & MacFarlane, P.C.

(57) ABSTRACT

A high-pressure tank for a vehicle that includes a tank body and a pair of end caps that are positioned at opposite ends of the tank body. The tank body includes (i.e., is formed from) a first material, and the pair of end caps include (i.e., are formed from) a second material that is different than the first material.

20 Claims, 4 Drawing Sheets

FIG. 3
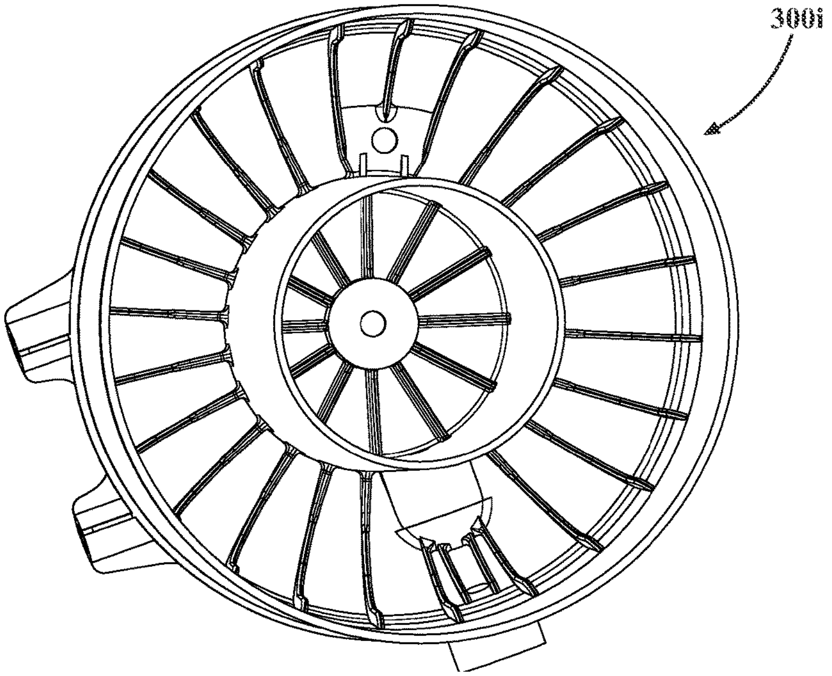
FIG. 4
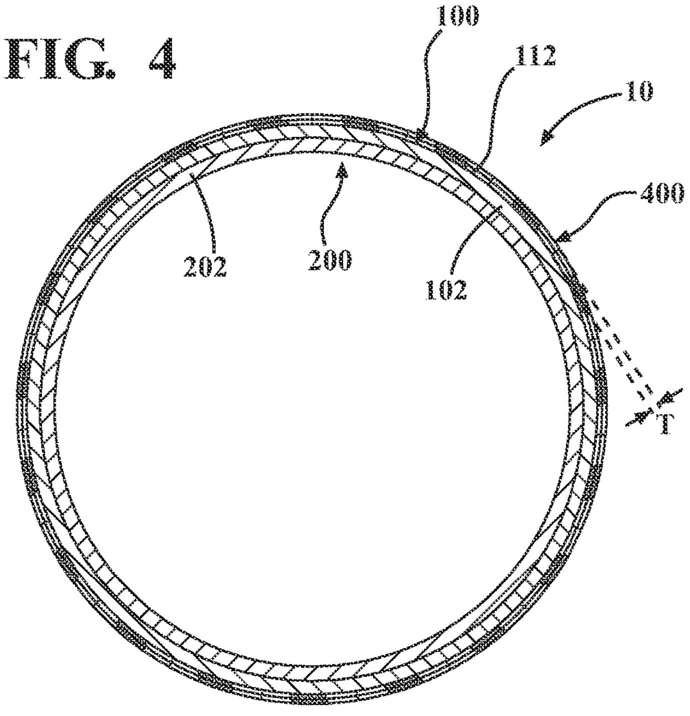
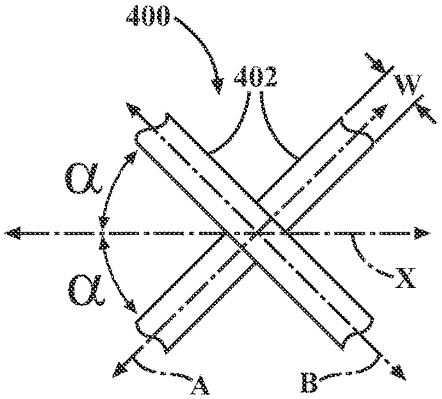
FIG. 5

MULTI-MATERIAL HIGH-PRESSURE TANKS FOR VEHICLES

TECHNICAL FIELD

The present disclosure relates to high-pressure tanks for vehicles (e.g., trucks, semitrailers, tractor-trailers, etc.) that utilize a multi-material construction.

BACKGROUND

High-pressure tanks are often used to store various fluids (e.g., air, liquids, etc.) that support the operation of one or more systems on a vehicle (e.g., the braking system, the suspension system, etc.). Known tanks, however, typically utilize a single material of construction (e.g., a metallic material, such as steel or aluminum, a plastic material, or a composite material), which creates challenges with weight, cost, and/or manufacturing complexity. For example, whereas metallic tanks are heavy, economical, and simple to manufacture, plastic tanks and composite tanks offer light-weight solutions, but present manufacturing difficulties. Additionally, due to the increased material cost, composite tanks often fail to offer a cost-effective alternative.

As such, a need remains for a high-pressure tank that balances weight, cost, and manufacturing complexity, which is addressed by the present disclosure.

SUMMARY

In one aspect of the present disclosure, a high-pressure tank for a vehicle is disclosed that includes: a tank body; a liner that extends within the tank body; a pair of end caps that are secured to the liner, and which are positioned at opposite ends of the tank body; and a bolster that is configured to support load on the tank body and inhibit deflection thereof, wherein the bolster extends about the tank body, and is located between the pair of end caps. The tank body includes (i.e., is formed from) a composite material, and the liner and the pair of end caps include (i.e., are formed from) a common (shared) plastic material. At least one of the pair of end caps includes at least one functional attachment that is formed integrally therewith.

In certain embodiments, the bolster may be configured as a tape that is wound about the tank body in a lattice configuration.

In certain embodiments, the bolster may be configured as at least one sleeve.

In certain embodiments, the tank body may include a first body portion and a second body portion that is secured to the first body portion so as to define an interface.

In certain embodiments, the bolster may span the interface.

In another aspect of the present disclosure, a high-pressure tank for a vehicle is disclosed that includes a tank body and a pair of end caps that are positioned at opposite ends of the tank body. The tank body includes (i.e., is formed from) a first material, and the pair of end caps include (i.e., are formed from) a second material that is different than the first material.

In certain embodiments, the tank body may include a composite material, and the pair of end caps may include a plastic material.

In certain embodiments, at least one of the pair of end caps may include at least one functional attachment that is formed integrally therewith.

In certain embodiments, the at least one functional attachment may include one or more of a drain valve, an inlet/outlet port, a sensor housing, and a mounting boss.

In certain embodiments, the high-pressure tank may further include a liner that extends within the tank body.

In certain embodiments, the pair of end caps may be secured to the liner.

In certain embodiments, the liner may include the second material.

In certain embodiments, the pair of end caps and the liner may be integrally formed.

In certain embodiments, the high-pressure tank may further include a bolster that extends about the tank body, wherein the bolster is configured to support load on the tank body and inhibit deflection thereof.

In certain embodiments, the bolster may be configured as a tape that is wound about the tank body along intersecting axes that are each oriented at an acute angle in relation to a longitudinal axis of the tank body.

In certain embodiments, the tank body may include a first body portion and a second body portion that is secured to the first body portion so as to define an interface.

In certain embodiments, the bolster may span the interface.

In another aspect of the present disclosure, a method of manufacturing a high-pressure tank for a vehicle is disclosed. The method includes: forming a tank body from a first material; forming a pair of end caps from a second material that is different than the first material; positioning the pair of end caps at opposite ends of the tank body; and fortifying the tank body by applying a bolster to an external surface thereof such that the bolster extends between the pair of end caps.

In certain embodiments, the method may further include forming a liner from the second material, wherein the tank body extends about the liner, and the pair of end caps are secured to the liner.

In certain embodiments, forming the pair of end caps and forming the liner may include injection molding the pair of end caps and the liner such that the pair of end caps and the liner are integrally formed.

BRIEF DESCRIPTION OF THE DRAWINGS

The disclosure is best understood from the following detailed description when read in conjunction with the accompanying drawings. It is emphasized that, according to common practice, the various features of the drawings may be not to-scale. On the contrary, the dimensions of the various features may be arbitrarily expanded or reduced for clarity.

FIG. 3 is an inner, perspective view of one of the end caps.

FIG. 4 is a transverse, cross-sectional view of the tank taken along line 4-4 in FIG. 1.

FIG. 5 is a schematic illustration of the bolster.

DETAILED DESCRIPTION

Figure 1:
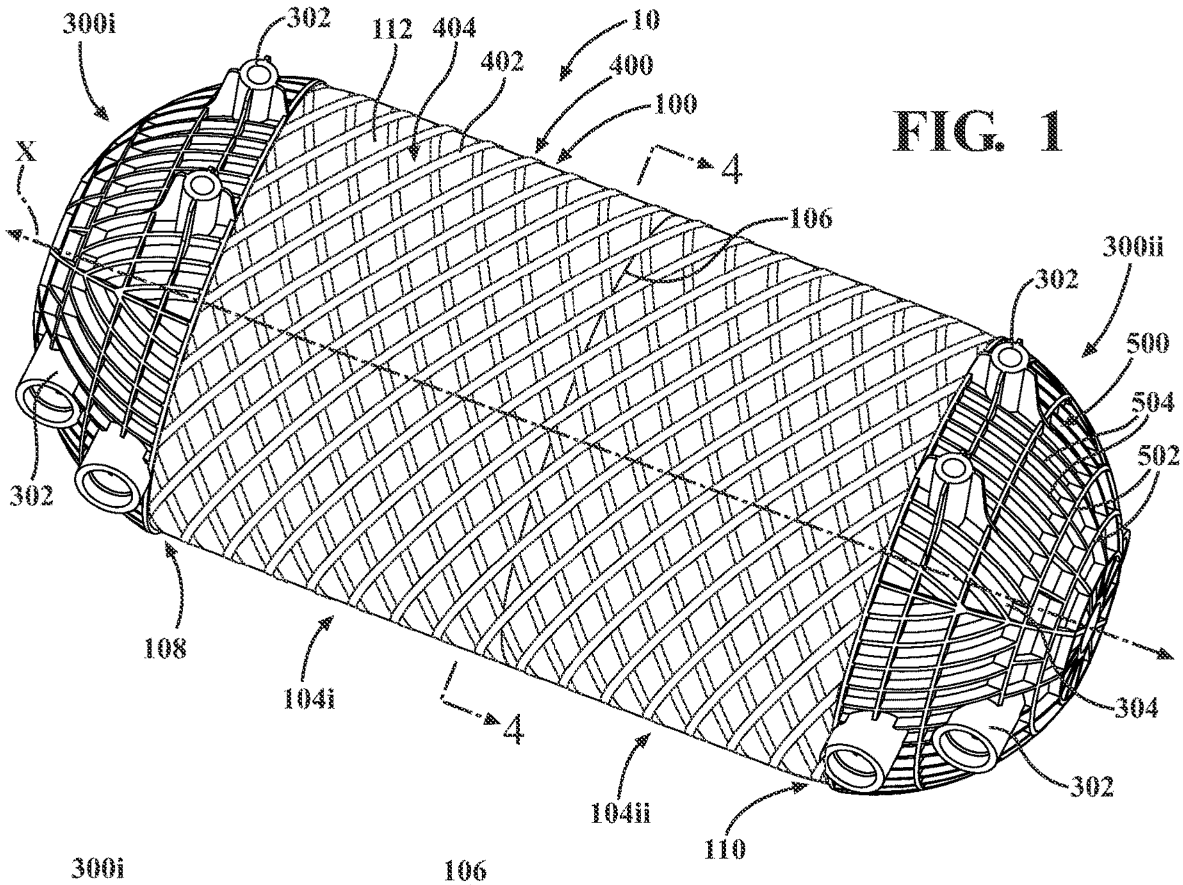
FIG. 1 is a top, perspective view of a high-pressure tank in accordance with the principles of the present disclosure, which includes: a tank body; a liner; a pair of end caps; and a bolster.
Figure 2:
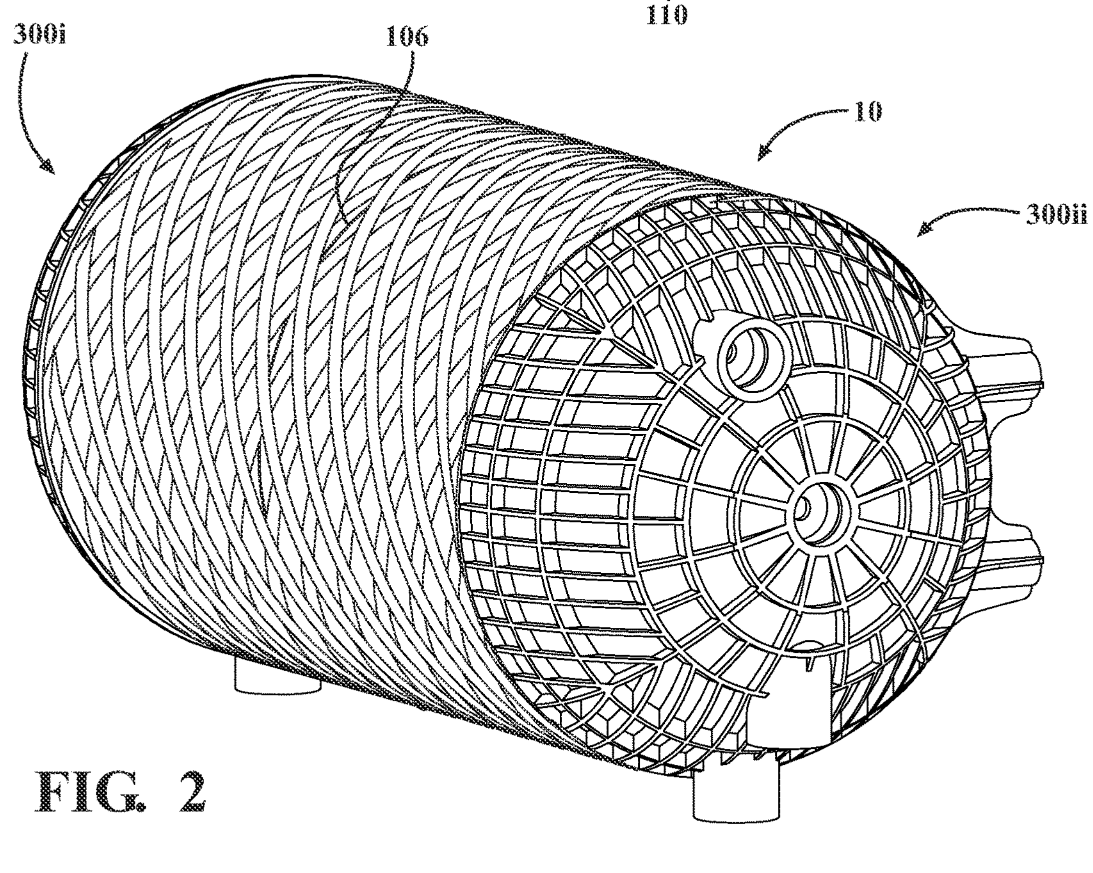
FIG. 2 is an end, perspective view of the tank.

The present disclosure describes a high-pressure tank for a vehicle that utilizes a multi-material construction. More specifically, the tank described herein includes: a composite tank body; a pair of plastic end caps; and a bolster (e.g., a fiber-reinforced uni-directional tape) that extends about the tank body in order to increase the strength (e.g., the rigidity) thereof and inhibit (if not entirely prevent) deflection (e.g., bending, flexure) during use of the vehicle. The multi-material construction of the tank not only simplifies manufacturing by obviating the winding and baking processes that are typically associated with the formation of composite end caps, but decreases the weight of the tank by reducing (if not entirely eliminating) the use of metallic materials. For example, it is envisioned that the weight of the tank can be reduced by approximately 60% when compared to steel tanks, and by approximately 30% when compared to aluminum tanks. Additionally, utilizing a plastic material in construction of the end caps decreases the total amount of composite material in the tank, which results in a corresponding reduction in cost, and facilities the incorporation of various functional attachments into one or more of the end caps.

With reference now to FIGS. 1-5, a high-pressure tank 10 is disclosed that is configured for use in storing one or more fluids (e.g., air, liquid) that support the operation of one or more systems on a vehicle (e.g., the vehicle's braking system, the vehicle's suspension system, etc.). As described in detail below, the tank 10 defines a (central) longitudinal axis X (FIG. 1) and includes: a tank body 100; a liner 200; a pair of end caps 300 (i.e., a first end cap 300*i* and a second end cap 300*ii*); and a bolster 400. While the tank 10 is generally illustrated and described herein as being configured for use with a truck (e.g., a semitrailer, a tractor-trailer, etc.), it should be appreciated that the present disclosure may find applicability to a wide variety of vehicles.

The tank body 100 is generally cylindrical in configuration and includes a (first) composite material 102 (FIG. 4) (e.g., Nylon PA6 GFx, PA66 GFx, PAPA GFx, or other such similar engineering plastics). In one embodiment of the disclosure, it is envisioned that the tank body 100 may be integral (i.e., monolithic, unitary) in construction, such that the tank body 100 is formed from a single piece of the composite material 102. Alternatively, as seen in FIG. 1, it is envisioned that the tank body 100 may include a (first) body portion 104*i* and a (second) body portion 104*ii* that is secured (connected) to the body portion 104*i* so as to define an interface 106 (e.g., a flange). In such embodiments, it is envisioned that the body portions 104*i*, 104*ii* may be secured (connected) together in any suitable manner such as, for example, via welding (e.g., hot gas welding, infrared welding, spin welding, vibration welding, ultrasonic welding, etc.).

The liner 200 (FIG. 4) extends (is located, positioned) within the tank body 100, and includes a (second) plastic material 202 (e.g., a nylon based thermoplastic). The liner 200 supports (is secured (connected) to) the end caps 300, as described in further detail below, and provides a seal that inhibits (if not entirely prevents) the escape of fluid(s) from the tank 10. Additionally, the liner 200 provides a substrate about which the composite material 102 can be wound during construction of the tank body 100, whereby liner 200 dictates, and provides a template for, the configuration of the tank body 100.

The end caps 300*i*, 300*ii* are positioned at opposite ends 108, 110 of the tank body 100, respectively. The end caps 300 are dome-line (e.g., hemispherical) in configuration, and include the (second) plastic material 202. The tank body 100 and the end caps 300 (as well as the liner 200) are thus formed from different materials, whereas the end caps 300 and the liner 200 formed from a common (shared) material (i.e., the plastic material 202), thereby attributing the aforementioned multi-material construction to the tank 10.

As indicated above, forming the end caps 300 from the plastic material 202 facilities the incorporation of various functional attachments 302 into one or more of the end caps 300. For example, it is envisioned that functional attachment (s) 302 may include one or more of a drain valve, which allows moisture (e.g., humidity) to be removed from the tank 10, an inlet/outlet port, which facilitates pressurization and depressurization of the tank 10, a (pressure) sensor housing, mounting bosses, which support connection of the tank 10 to the vehicle via one or more mechanical fasteners, etc. By utilizing the plastic material 202, the composite material 102 can be omitted from construction of the end caps 300, which simplifies manufacturing and assembly of the tank 10 by eliminating the complexities that may otherwise be associated with machining (e.g., drilling, cutting, etc.) the composite material 202.

As indicated above the end caps 300 are supported by (i.e., secured (connected) to) the liner 200. More specifically, in the illustrated embodiment, the end caps 300 and the liner 200 are integrally (i.e., monolithically, unitarily) formed from a single piece of the aforementioned plastic material 202 (FIG. 6), whereby the end caps 300 are indirectly secured (connected) to the tank body 100 via the liner 200. For example, it is envisioned that the end caps 300 and the liner 200 may be co-molded via injection molding, during which, (one or more) at least one of the functional attachment(s) 302 may be integrally formed with one or more of the end caps 300. Embodiments in which the liner 200 and the end caps 300 may be configured as discrete (separate) components that are connected together via welding (e.g., hot gas welding, infrared welding, spin welding, vibration welding, ultrasonic welding, etc.), via an adhesive, via one or more mechanical fasteners, etc., are also envisioned herein, however, as are embodiments in which the end caps 300 may be directly secured (connected) to the tank body 100, and would not be beyond the scope of the present disclosure.

The bolster 400 extends about the tank body 100 and is located between the end caps 300. The bolster 400 is configured to support load on the tank body 100, and provides a structural reinforcement that increases the strength (e.g., the rigidity) thereof so as to inhibit (if not entirely prevent) deflection (e.g., bending and/or flexure at or adjacent to the interface 106).

In the illustrated embodiment, the bolster 400 is configured as a tape 402 having a width W (FIG. 5) that lies substantially within the range of approximately 6 mm to approximately 25 mm (e.g., approximately 10 mm) and a thickness T (FIG. 4) that lies substantially within the range of approximately 0.05 mm to approximately 6 mm (e.g., approximately 0.5 mm). A bolster 400 in which the width W and/or the thickness T may lie substantially outside the disclosed range is also envisioned herein (e.g., depending upon the intended use of the tank 10), however, and would not be beyond the scope of the present disclosure.

The bolster 400 includes the aforementioned composite material 102, which is reinforced (impregnated) with unidirectional glass fibers. For example, it is envisioned that the fiber content of the bolster 400 may lie substantially within the range of approximately 40% to approximately 80%. A bolster 400 in which the fiber content may lie outside the disclosed range is also envisioned herein (e.g., depending upon the intended use of the tank 10), however, and would not be beyond the scope of the present disclosure.

With reference to FIGS. 1 and 5, (one or more) at least one layer of the tape 402 is applied to (wound about) the tank body 100 in a lattice configuration such that the tape 402 is oriented at the optimal fiber angles so as to maximize the strength of the tank 10 while reducing the overall weight thereof. More specifically, the bolster 400 is applied such that the layer(s) of tape 402 extends along intersecting axes A, B that are each oriented at an acute angle α (FIG. 5) in relation to the longitudinal axis X, whereby the bolster 400 forms a lattice 404 (FIG. 1) that spans (i.e., extends continuously across) the interface 106, which results in a generally uniform load distribution across the tank body 100, thereby improving stress uniformity at the interface 106 between the body portions 104*i*, 104*ii* and the overall strength of the tank 10. The bolster 400 thus fortifies tank body 100 (e.g., at the interface 106) such that a portion of any applied load is carried by the bolster 400, which increases the increases the strength (e.g., the rigidity) of the tank 10, and inhibits (if not entirely prevents) deflection thereof, as indicated above.

In the illustrated embodiment, the bolster 400 is configured and applied to the tank body 100 such that the angle α lies substantially within the range of approximately 30° to approximately 70° (e.g., approximately) 60°. A bolster 400 that is configured and applied to the tank body 100 such that the angle α lies outside the disclosed range is also envisioned herein (e.g., depending upon the intended use of the tank 10), however, and would not be beyond the scope of the present disclosure.

While the bolster 400 is configured and applied to the tank body 100 such that the axes A, B are each oriented at a generally identical angle in relation to the longitudinal axis X (i.e., the angle α) in the illustrated embodiment, it is also envisioned that the bolster 400 may be configured and applied to the tank body 100 such that the axes A, B are oriented at different angles in relation to the longitudinal axis X.

Figure 6:
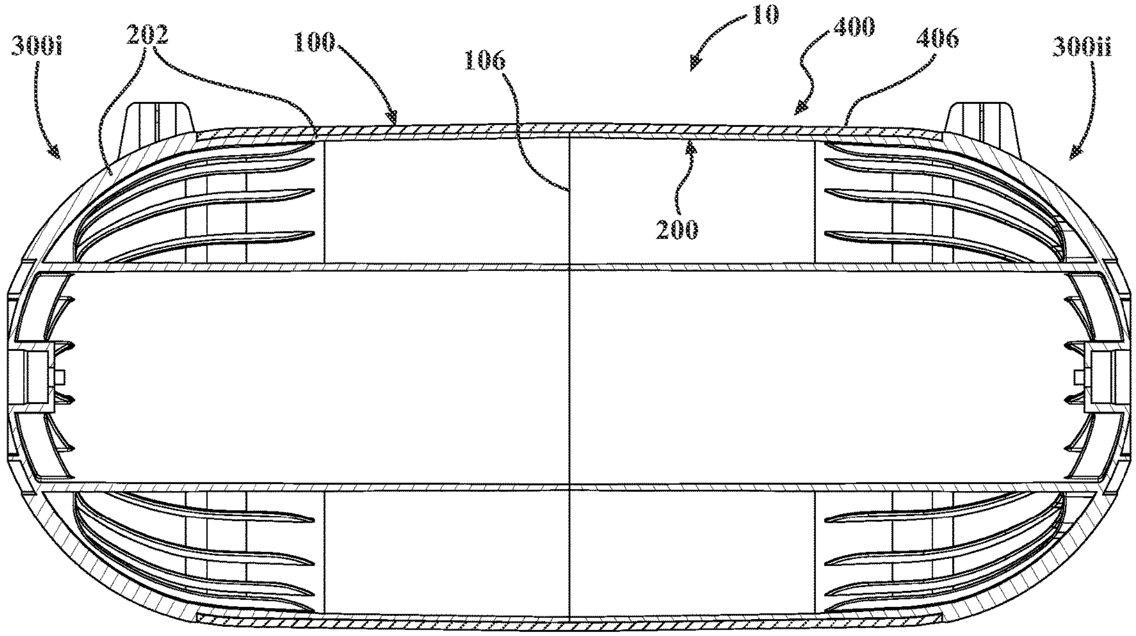
FIG. 6 is an axial, cross-sectional view of the tank shown with an alternate embodiment of the bolster, which is configured as a sleeve.
Figure 7:
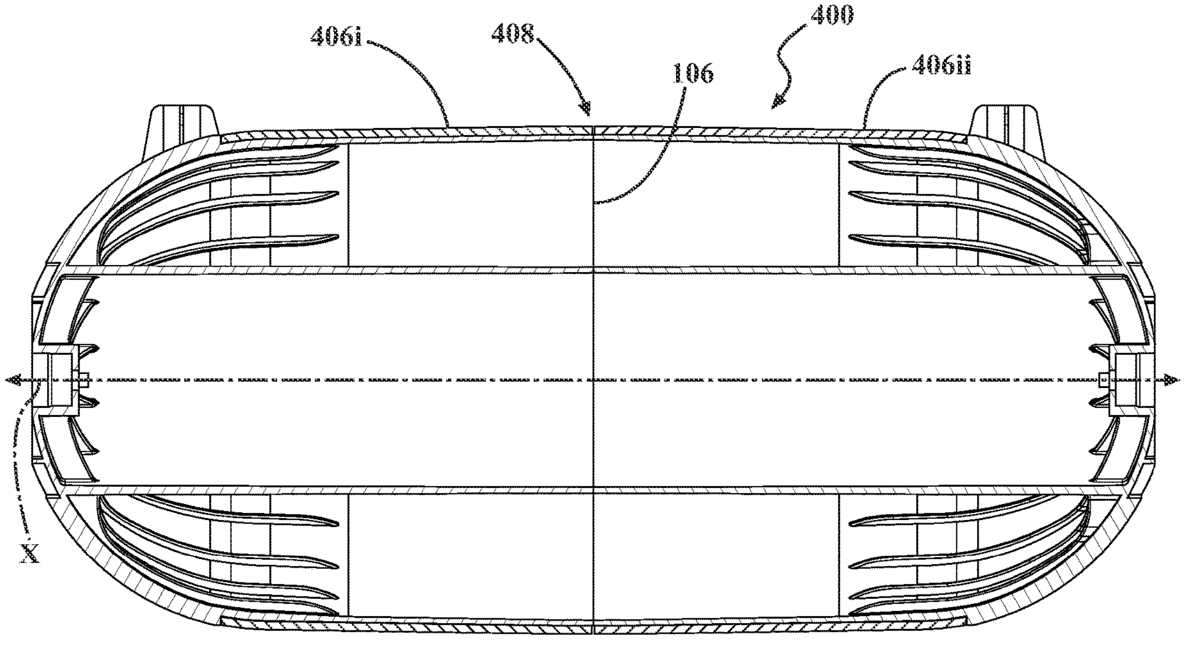
FIG. 7 is an axial, cross-sectional view of the tank shown with another alternate embodiment of the bolster, which is configured as a pair of sleeves.

FIGS. 6 and 7 illustrate additional embodiments of the disclosure in which the bolster 400 is configured as (one or more) at least one sleeve 406 of the aforementioned (reinforced) composite material 102 (FIG. 4). For example, in the embodiment illustrated in FIG. 6, the tank 10 includes a single sleeve 406 that spans the interface 106, whereas FIG. 7 illustrates an embodiment in which the bolster 400 includes a pair of sleeves 4061, 406*ii* that are separated by an axial gap 408 that is generally aligned with the interface 106 along the longitudinal axis X. As such, in contrast to the embodiments illustrated in FIGS. 1 and 6, in the embodiment illustrated in FIG. 7, the bolster 400 extends discontinuously along the tank body 100.

It is envisioned that the sleeve(s) 406 may be manufactured using any suitable process. For example, it is envisioned that the composite material 102 may wound into a generally cylindrical core, which can then be heated (e.g., in an infrared oven at approximately 180° C.), placed in a mold, and overmolded to the tank body 100 (e.g., via injection molding).

Figure 8:
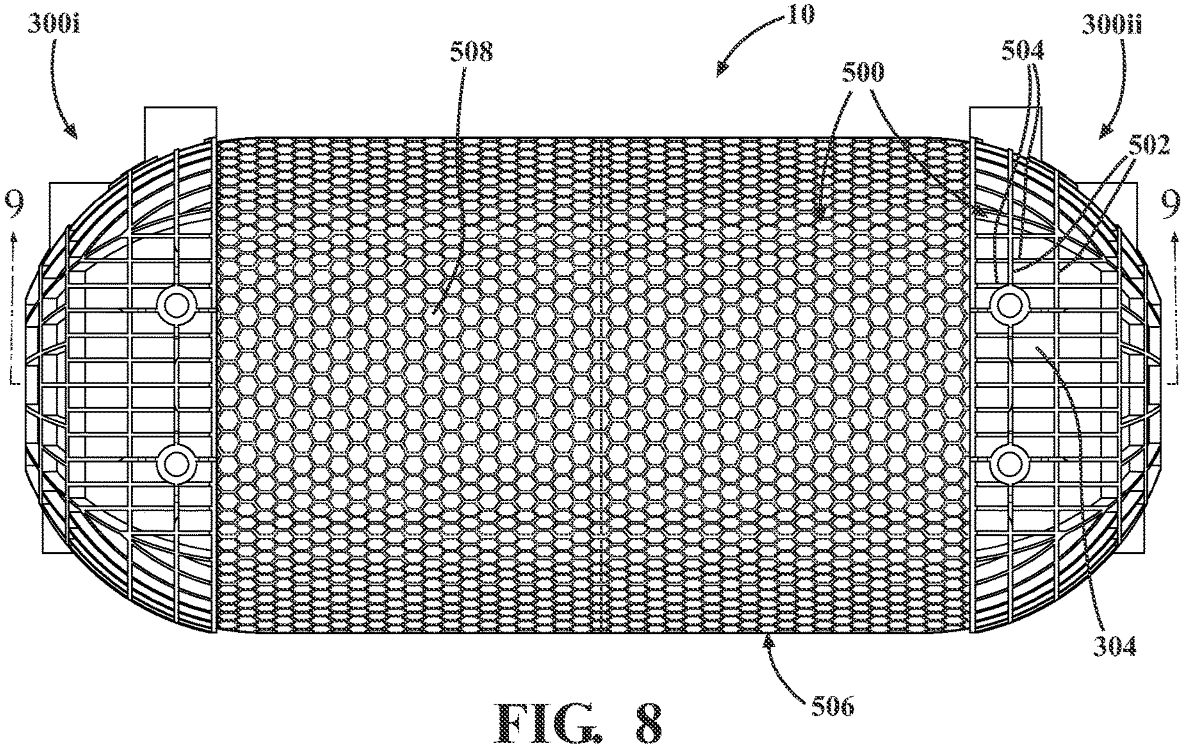
FIG. 8 is a top, plan view of an alternate embodiment of the tank, which includes a protective covering.
Figure 9:
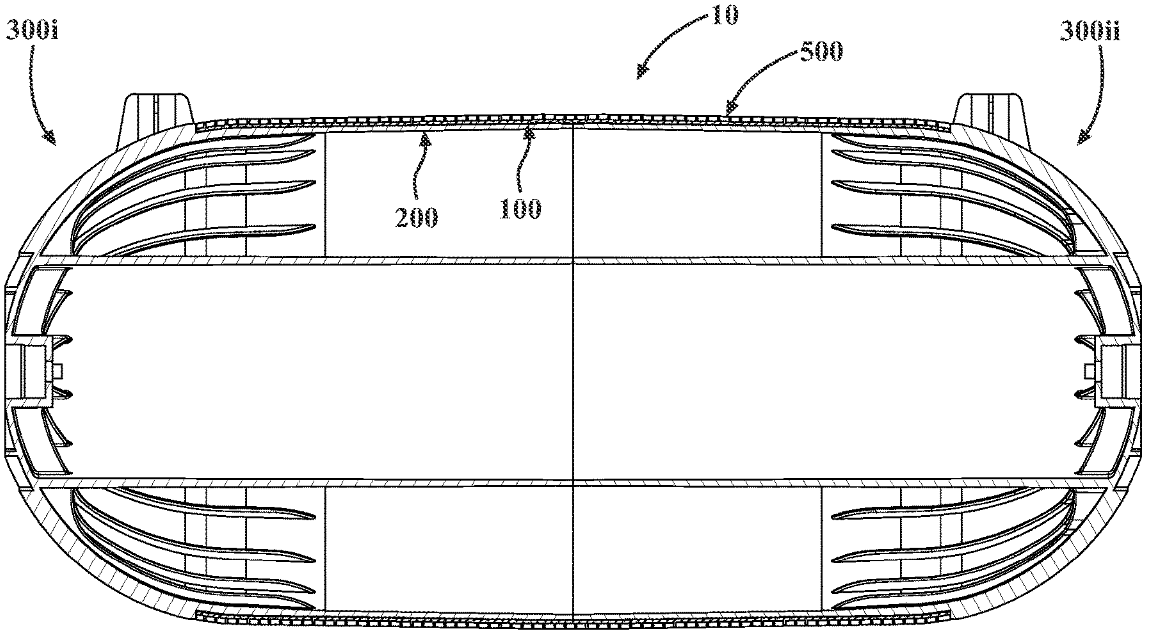
FIG. 9 is an axial, cross-sectional view taken along line 9-9 in FIG. 8.

With reference to FIGS. 1, 8, and 9, in certain embodiments, the tank 10 may include a protective covering 500 in order to further increase the strength (e.g., the rigidity) of the tank 10 and shield the tank 10 from stones, rocks, and other such debris. The protective covering 500 may be provided on one or more areas of the tank 10 including, for example, the tank body 100 (FIGS. 1, 4) and/or the end caps 300*i*, 300*ii*. For example, in the embodiment of the tank 10 illustrated in FIG. 1, the protective covering 500 is exclusively provided on the end caps 300, and includes a plurality of (first) ribs 502 and a plurality of (second) ribs 504, each of which extends along an outer surface 304 of the end caps 300. More specifically, the ribs 502 are generally annular in configuration and are arranged concentrically about the longitudinal axis X of the tank 10, and the ribs 504 are generally arcuate in configuration and extend radially outwardly therefrom.

In the embodiment illustrated in FIGS. 8 and 9, the protective covering 500 includes a web 506 that is provided on the tank body 100, which may replace or supplement the ribs 502 and/or the ribs 504. Although shown as defining generally hexagonal interstices 508 in the illustrated embodiment, it is envisioned that the interstices 508 may define any configuration suitable for the intended purpose of strengthening and/or protecting the tank 10 in the manner described herein. For example, embodiments in which the web 506 may be configured such that the interstices 508 are generally rectangular, generally square-shaped, generally triangular, generally diamond-shaped, etc., are also envisioned herein, and would not be beyond the scope of the present disclosure.

In certain embodiments, it is envisioned that the protective covering 500 may be formed integrally (i.e., monolithically, unitarily) with the end caps 300 and/or the tank body 100 from a single piece of the germane material (i.e., the plastic material 202 utilized in construction of the end caps 300, or the composite material 102 utilized in construction of the tank body 100). Alternatively, it is envisioned that the protective covering 500 may be formed as one or more discrete (separate) components that are connected to the end caps 300 and/or the tank body 100 via welding (e.g., hot gas welding, infrared welding, spin welding, vibration welding, ultrasonic welding, etc.), via an adhesive, via one or more mechanical fasteners, etc. For example, it is envisioned that the protective covering 500 (i.e., the web 506) may be applied via a second shot injection that is molded to the tank body 100.

With reference now to FIGS. 1, 4, and 8, a method of manufacturing the tank 10 will be discussed. Prior to assembly of the tank 10, the individual components thereof (i.e., the tank body 100, the liner 200, the end caps 300, the bolster 400, and the protective covering 500) are formed in any suitable order. More specifically, the liner 200 and the end caps 300, including the ribs 502, the ribs 504, and/or the functional attachment(s) 302, are (integrally) formed via injection molding of the plastic material 202, and the tank body 100 and the bolster 400 are formed via winding of the composite material 102, with the bolster 400 being reinforced (impregnated) with the aforementioned glass fibers. During formation of the tank body 100, the composite material 102 is wound about the liner 200 such that the tank body 100 extends about the liner 200 with the end caps 300 being positioned at the opposite ends 108, 110 thereof.

Thereafter, the tank body 100 is fortified by applying the bolster 400 to an external surface 112 (FIGS. 1, 4) thereof such that the bolster 400 spans the interface 106 (FIG. 1) between the body portions 104*i*, 104*ii*, and extends between the end caps 300. More specifically, the bolster 400 (i.e., the tape 402) is heated and applied to the tank body 100, which allows the composite material 102 in the tape 402 to bond to the composite material 102 in the tank body 100. Force is then applied to the bolster 400 (e.g., via a compression roller) in order to secure the bolster 400 to the tank body 100, after which, the web 506 can be applied (if necessary or desired).

In certain embodiments, the pair of end caps may include hemispherical outer surfaces.

In certain embodiments, the pair of end caps are positioned at opposite ends of the tank body such that the hemispherical outer surfaces are exposed therefrom.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A high-pressure tank for a vehicle, the high-pressure tank comprising:

a tank body including a composite material;

a liner extending within the tank body;

a pair of end caps secured to the liner and including hemispherical outer surfaces, wherein the pair of end caps are positioned at opposite ends of the tank body such that the opposite ends of the tank body are positioned between the pair of end caps and such that the hemispherical outer surfaces are exposed therefrom, wherein the liner and the pair of end caps include a common plastic material, and at least one of the pair of end caps includes at least one integral functional attachment; and a bolster extending about the tank body and located between the pair of end caps, wherein the bolster is configured to support load on the tank body and inhibit deflection thereof.

2. The high-pressure tank of claim 1, wherein the bolster is configured as a tape wound about the tank body in a lattice configuration.

3. The high-pressure tank of claim 1, wherein the bolster is configured as at least one sleeve.

4. The high-pressure tank of claim 1, wherein the tank body includes:

a first body portion; and a second body portion secured to the first body portion so as to define an interface.

5. The high-pressure tank of claim 4, wherein the bolster spans the interface.

6. A high-pressure tank for a vehicle, the high-pressure tank comprising:

a tank body including a first material; and a pair of end caps positioned at opposite ends of the tank body such that the opposite ends of the tank body are positioned between the pair of end caps and such that hemispherical outer surfaces defined by the pair of end caps are exposed from the tank body, wherein the pair of end caps include a second material different than the first material.

7. The high-pressure tank of claim 6, wherein the tank body includes a composite material, and the pair of end caps include a plastic material.

8. The high-pressure tank of claim 6, wherein at least one of the pair of end caps includes at least one integral functional attachment.

9. The high-pressure tank of claim 8, wherein the at least one integral functional attachment includes one or more of a drain valve, an inlet/outlet port, a sensor housing, and a mounting boss.

10. The high-pressure tank of claim 6, further comprising:
a liner extending within the tank body.

11. The high-pressure tank of claim 10, wherein the pair of end caps are secured to the liner.

12. The high-pressure tank of claim 11, wherein the liner includes the second material.

13. The high-pressure tank of claim 11, wherein the pair of end caps and the liner are integrally formed.

14. The high-pressure tank of claim 6, further comprising:
a bolster extending about the tank body, wherein the bolster is configured to support load on the tank body and inhibit deflection thereof.

15. The high-pressure tank of claim 14, wherein the bolster is configured as a tape wound about the tank body along intersecting axes each oriented at an acute angle in relation to a longitudinal axis of the tank body.

16. The high-pressure tank of claim 14, wherein the tank body includes:
a first body portion; and
a second body portion secured to the first body portion so as to define an interface.

17. The high-pressure tank of claim 16, wherein the bolster spans the interface.

18. A high-pressure tank for a vehicle, the high-pressure tank comprising:
a tank body;
a pair of end caps positioned at opposite ends of the tank body such that the opposite ends of the tank body are positioned between the pair of end caps, wherein the pair of end caps include hemispherical outer surfaces exposed from opposite ends of the tank body; and
a bolster extending about the tank body and located between the pair of end caps, wherein the bolster is configured to support load on the tank body and inhibit deflection thereof.

19. The high-pressure tank of claim 18, further comprising:
a liner extending within the tank body.

20. The high-pressure tank of claim 19, wherein the pair of end caps are secured to the liner.

* * * * *